United States Patent [19]

Woods et al.

[11] Patent Number: 4,577,307

[45] Date of Patent: Mar. 18, 1986

[54] OPTICAL DISK MAGNETIC LOAD/UNLOAD MECHANISM

[75] Inventors: John W. Woods; Paul Kummli; Edward M. White, all of Boulder County, Colo.

[73] Assignee: Storage Technology Partners II, Louisville, Colo.

[21] Appl. No.: 655,847

[22] Filed: Sep. 27, 1984

[51] Int. Cl.[4] .......................... G11B 9/06; G11B 19/20
[52] U.S. Cl. ..................................... 369/270; 369/271
[58] Field of Search ............................... 369/270, 271

[56] References Cited

U.S. PATENT DOCUMENTS 4,232,870 11/1980 Iemenschot ........................ 369/270
4,387,454 6/1983 Yamamura et al. ................ 369/270
4,502,136 2/1985 Rickert et al. ..................... 369/271

Primary Examiner—Steven L. Stephan
Attorney, Agent, or Firm—Bryant R. Gold; James R. Young

[57] ABSTRACT

An apparatus for clamping and unclamping an optical disk in an information storage and retrieval device having removabe media. The apparatus has rotating and a non-rotating disk support assemblies, the non-rotating disk support assembly being attached to an elevator which reciprocatively raises and lowers the rotating and non-rotating disk support assemblies. The rotating disk support assembly is magnetically clamped to the non-rotating disk support assembly by an electromagnet during the loading and centering operation. The rotating disc support assembly has a centering stem which cooperates with a hole in the device spindle to center the rotating disk support assembly relative to the device spindle. In the preferred embodiment, the disk has a flexure and a tapered disk centering hub which cooperates with a taper on the hole in the device spindle to center the disk relative to the device spindle. After the disk is centered relative to the device spindle, a shunt plate on the mating face of the device spindle cooperates with a set of permanent magnets in the rotating disk support assembly to magnetically clamp the disk to be rotated between the device spindle and the rotating disk support means. To unload, the above described procedures are reversed.

6 Claims, 4 Drawing Figures

OPTICAL DISK MAGNETIC LOAD/UNLOAD MECHANISM

BACKGROUND OF THE INVENTION

The disclosed invention relates to the field of information recording disk handling apparatus, and in particular to apparatus for the centering and clamping of optical information recording disks in and information storage device having interchangeable media capabilities.

As the need for storage of information has increased, the ability to store information ever more densely on a recording media has also increased. In response, data has been recorded on magnetic and optical disks at ever increasing densities. However, in devices not having removable or interchangeable media, once the device's storage capabilities have been reached, no additional information may be recorded without, in the case of magnetic media, deleting prior recorded data. Thus for additional data to be recorded, additional devices have been necessary.

To address this problem, there have been devices developed which have interchangeable media. In magnetic recording devices having interchangeable media, the entire magnetic head disk-pack is changed. With disk-packs, the entire head includes the disks, the read/write heads and the actuators. Interchanging these disk-packs has been expensive, for exchange of a recording disk requires purchase of the entire disk-pack and the expensive elements therein.

To avoid the expense of completely changing the entire head assembly, movement has been made toward having devices wherein only the disk itself is removed. This significantly reduces the cost of adding additional storage capacities. Removable disks have worked well with low density low storage system, such as the magnetic floppy disks used with personal computers. However, for high density high storage applications, such as with optical disk storage systems, and with the minute dimensions involved with achieving high density storage, accurate centering of the disk to the device spindle is essential. Additionally, this precise centering must be repeatable. And further, once the device is centered, it must be securely clamped to the device spindle. In particular, the need for precise centering and secure clamping often are at cross purposes for the disk must remain precisely centered after the disk is clamped to the device spindle. Accordingly, the centering and clamping of the disk to the device spindle has presented particular problems. The disclosed invention addresses these problems. In particular, it provides a means for first centering the disk relative to the device spindle and thereafter clamping it securely in place for device rotation.

It is an object of the disclosed invention to provide a means for precisely centering an optical disk on the spindle of an optical information storage device.

It is another object of the disclosed invention to provide a means for the repeatable centering of an optical disk on an optical information storage device spindle.

It is still yet another object of the disclosed invention to provide means for selectively clamping the optical disk to the optical information storage device spindle.

BRIEF SUMMARY OF THE INVENTION

The disclosed invention, a disk centering and clamping apparatus, is comprised of a rotating and a non-rotating disk support assembly. The non-rotating disk support assembly is attached to a reciprocating elevator means. This non-rotating disk support assembly has a non-magnetic housing. This housing has mounted on the bottom thereof a downward projecting stem. This stem accepts a connecting rod which is slidably mounted therein. The lower end of the rod is in turn connected to a reciprocating elevator means. The housing also has an upward facing, cylindrically shaped, cavity which retains a selectively activated electromagnet. This electromagnet is slidably mounted for lateral movement within this cavity, so that when it is activated, it clamps the non-rotating disk support assembly to the rotating disk assembly, but such that it can laterally move with the rotating disk support assembly when that assembly is centered relative to the device spindle.

The rotating disk support assembly has a disk support platter which has a magnetically permeable shunt plate attached to its lower surface. The shunt plate is received within the cavity of the non-rotating disk support assembly and cooperates with the electromagnet to clamp the rotating disk support assembly to the non-rotating disk support assembly. The disk support platter also has a center hole through which is mounted a centering stem, this stem having a ball-shaped upper end. The disk support platter also has an upward facing raised rim around its outer edge. This raised rim supports the disk. Finally, the disk support platter has a plurality of permanent magnets attached on its upper mating surface.

The device spindle has a center hole. The lower portion of the spindle hole is tapered. The upper portion of the spindle hole has a cylindrical shape.

In the preferred embodiment, the disk has a center opening into which is attached a flexible hub assembly comprised of a deformable flexure having a hole into which is attached a centering hub. The centering hub has an outside taper which cooperates with the taper on the spindle hole to center the disk support platter relative to the device spindle.

The disk support platter further has a plurality of selectively activated plunger assemblies which operate to selectively flex the disk centering hub to mate with the tapered portion of the hole in the device spindle, to center the disk relative to the device spindle.

Around the outer edge of the mating surface of the device spindle, there is located a downward facing rim whose diameter substantially matches that of the raised rim on the support platter. Together, these rims clamp the disk to the device spindle for rotation. The device spindle also has a magnetically permeable ring-shaped shunt plate or keeper plate in its mating surface. The shunt plate is positioned substantially over the permanent magnets which are located in the platter surface. When the rotating disk support assembly is in close proximity to the spindle, it is attracted to the spindle causing the rotating disk support assembly to be clamped to the device spindle.

In operation, the disk is supported around its outer edge by the rim on the disk support platter. In the lowered position, the electromagnet securely clamps the rotating disk support assembly to the non-rotating disk support assembly. The elevator raises the rotating and non-rotating disk support assemblies. As the assemblies are raised, the centering stem of the disk support platter engages the cylindrical hole in the device spindle, centering the rotating disk support assembly relative to the device spindle. The disk then comes in contact with the protruding outer rim of the device spindle. At this point, the plunger assemblies are activated, causing the flexure to deflect upward raising the disk centering hub on the disk to engage the tapered bevel of the device spindle hole. The hub and tapered bevel cooperate to center the disk relative to the device spindle. Once centered, the electromagnet is deactivated allowing the permanent magnet to clamp the disk between the disk support platter and the device spindle. After the disk is clamped, the elevator is slightly lowered, thereby freeing the rotating disk support assembly to rotate freely with the device spindle. To remove the disk from the device spindle, the above described sequence is reversed.

DETAILED DESCRIPTION OF THE PREFERRED EMBODIMENT

Figure 1:
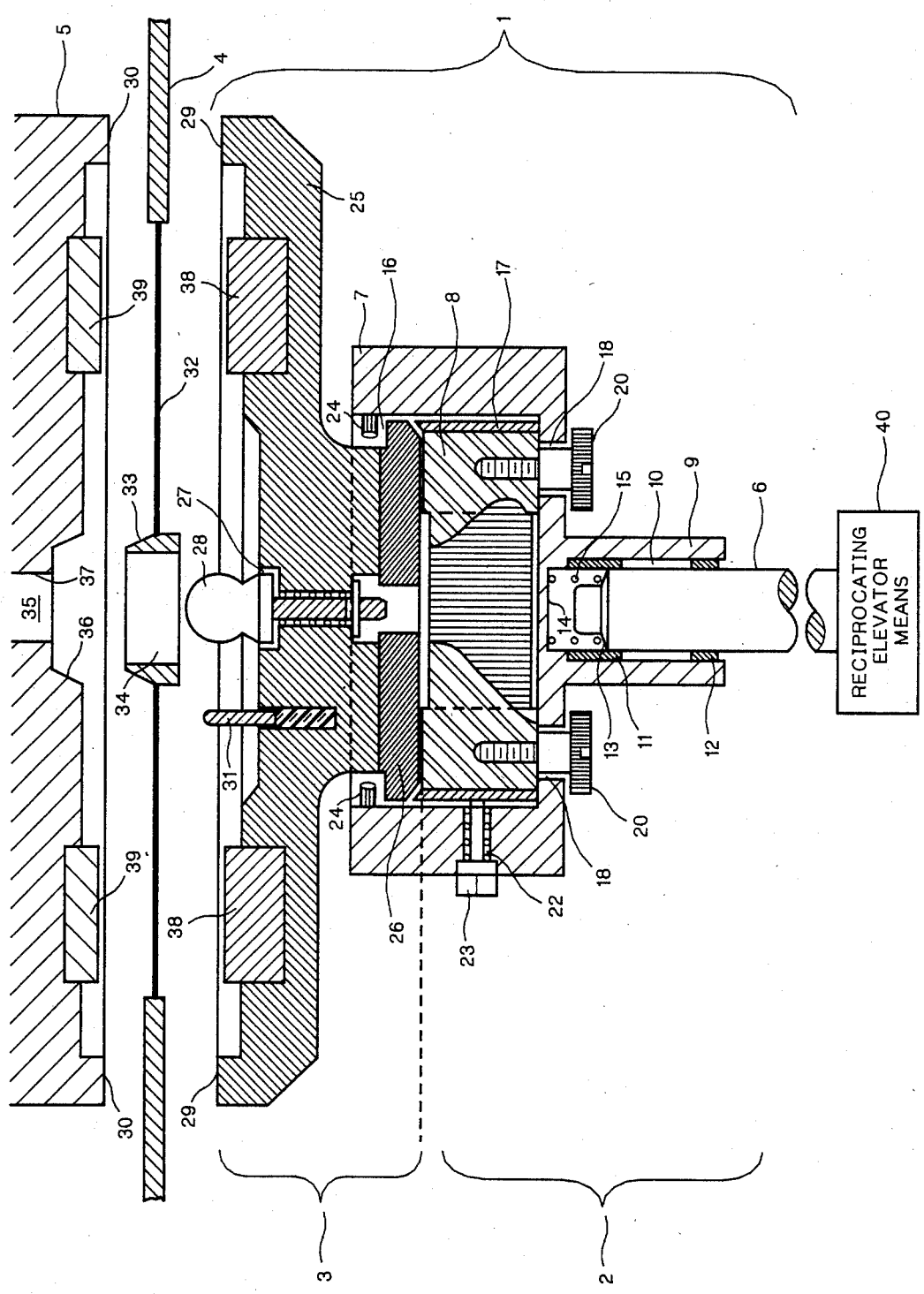
FIG. 1 is a sectional view showing the components of the disclosed invention.

As shown in FIG. 1, the disclosed invention, an optical disk centering and clamping apparatus 1, has a non-rotating disk support assembly 2 which is connected to a reciprocating elevator means and a rotating disk support assembly 3, which is selectively clamped to either the non-rotating assembly 2 during disk 4 load/unload operation or to the device spindle 5 during device read/write operation.

The non-rotating disk support assembly 2 has as its major components a connecting rod 6, which is connected to the reciprocating elevator means 40, a non-magnetic housing 7 and an electromagnet 8. As shown in FIG. 1, the lower portion of the housing 7 has a lower stem 9 having a cylindrical opening 10 into which is inserted the upper end of the connecting rod 6. The connecting rod 6 is free to reciprocatively slide within the housing stem cavity 10. The centering rod 6 is retained in place by a pair of spacers 11 and 12. The upper end of the connecting rod 6 has a shoulder 13 which cooperates with the closed end 14 of the housing stem cavity 10 to retain a first coil compression spring 15. This first coil compression spring 15 acts as a shock absorber to compensate for any additional movement of the elevator means upward when the centering and clamping device 1 is fully positioned against the device spindle 5, and any further upward movement would cause structural damage to either the device or the disk 4 itself.

As shown in FIG. 1, the housing 7 has an upward opening center cavity 16 into which is disposed the electromagnet 8. Disposed around the electromagnet 8 is a shunt plate centering ring 17. This centering ring 17 has an upper end that extends slightly above the upper plane of the electromagnet 8. This upper end of the centering ring 17 has a tapered inner edge. The function of the shunt plate centering ring 17 will be discussed in detail below. In addition, the housing 7 has a first set of at least three equally spaced oversized holes 18 (only two are shown in the sectional views of FIGS. 1-4) in its lower surface through which pass a set of at least three attaching screws 20. These attaching screws slidably retain the electromagnet 8 within the housing cavity 16. The oversized holes 18 allow the electromagnet 8 and attaching screws 20 to translate laterally within the housing cavity 16, while retaining the electromagnet 8 within the housing cavity 16. The housing 7 has a second set of holes 22 (only one is shown in the sectional view of FIGS. 1-4) into which are threadably mounted a set of spring loaded centering screws 23. The spring loaded centering screws 23 are equally spaced and apply pressure to nominally center the electromagnet 8 within the housing cavity 16, but can be retracted slightly by the centering pressure when the rotating disk support assembly 3 and the electromagnet 8 are centered with respect to the device spindle 5 (the full operation of which is discussed below).

A third set of holes in the housing 7 slidably retain a set of shunt plate mounting pins 24. The shunt plate mounting pins 24 are used to manually unclamp the rotating disk support assembly 3 from the device spindle 5 should the electrical system of the device fail. In the preferred embodiment, the means for manually unclamping the disk is comprised of: a plurality of retractable retaining pins 24 disposed in the non-rotating disk support assembly 2; the rotating disk support assembly 3 further having a lower lip which cooperates with the fully inserted retaining pins 21 to pull the rotating disk support means 3 downward when the non-rotating disk support means 2 is manually moved downward. The retaining pins are manually inserted to engage the lower lip on the rotating disk support assembly 3. To manually unclamp the disk support platter 23, the elevator is manually lowered, pulling the disk support assembly 3 and the disk 4 away from the device spindle 5.

The rotating disk support assembly 3 is comprised of a disk support platter 25, having attached to it a plurality of components. Attached to the bottom of the support platter 25 is a magnetically permeable, disk shaped, shunt plate 26. This shunt plate 26 provides the magnetic connection to the electromagnet 8 disposed in the housing for clamping of the rotating disk support assembly 3 to the non-rotating disk support assembly 2. The lower outside edge of the shunt plate 26 has a bevel which substantially matches that of the slightly protruding upper end of the shunt plate centering ring 17. Together the bevel on the shunt plate 26 and the taper on the shunt plate centering ring 17 cooperate to nominally center the shunt plate 26 when it is clamped to the electromagnet 8. During device load and unload operations, the electromagnet 8 is selectively energized so that the magnetic force securely clamps the shunt plate 26 to the electromagnet 8, This in turn clamps the rotating disk support assembly 3 to the non-rotating disk support assembly 2, so that the elevator may selectively raise and lower the entire apparatus 1 as a single unit.

The disk support platter 25 has a center hole 27 into which is mounted a centering stem 28 which has a ball-shaped upper end. The centering stem 28 is used to center the disk support platter 25 with respect to the device spindle 5.

In addition, the disk support platter 25 has an upward protruding rim 29 along its outer edge which cooperates with a lower protruding rim 30 on the device spindle 5 to selectively clamp the disk 4 to the device spindle 5 between the disk support platter 25 and the device spindle 5.

As shown in FIG. 1, the disk support platter 25 also has a plurality of holes (not all of which are shown)

through which are mounted a set of plunger assemblies 31.

In the preferred embodiment, the disk 4 has a center opening into which is attached a thin deformable, flexure 32, said flexure 32 in turn having a center opening into which is mounted a disk centering hub 33. In the preferred embodiment, the disk centering hub 33 has a center passage 34, of a diameter sufficiently large so as to allow passage of the ball-shaped upper end of the centering stem 28, and an outer, upper taper. The outer, upper taper is used to center the disk 4 on the device spindle 5.

In the preferred embodiment, the device spindle 5 has a center hole 35 whose lower portion has a taper 36 which substantially matches that of the outer taper of the disk hub 33 and a cylindrically shaped upper portion 37 of the hole 35 which is slightly larger than the diameter of the ball-shaped upper end of the centering stem 28. The lower portion of the tapered portion 36 of the hole 35 is larger than the upper portion.

In the preferred embodiment, the disk support platter 25 also has a plurality of permanent magnets 38 placed on its upper surface in a position which substantially matches that of a ring shunt keeper 39 which is disposed in the lower surface of the device spindle 5.

Figure 2:
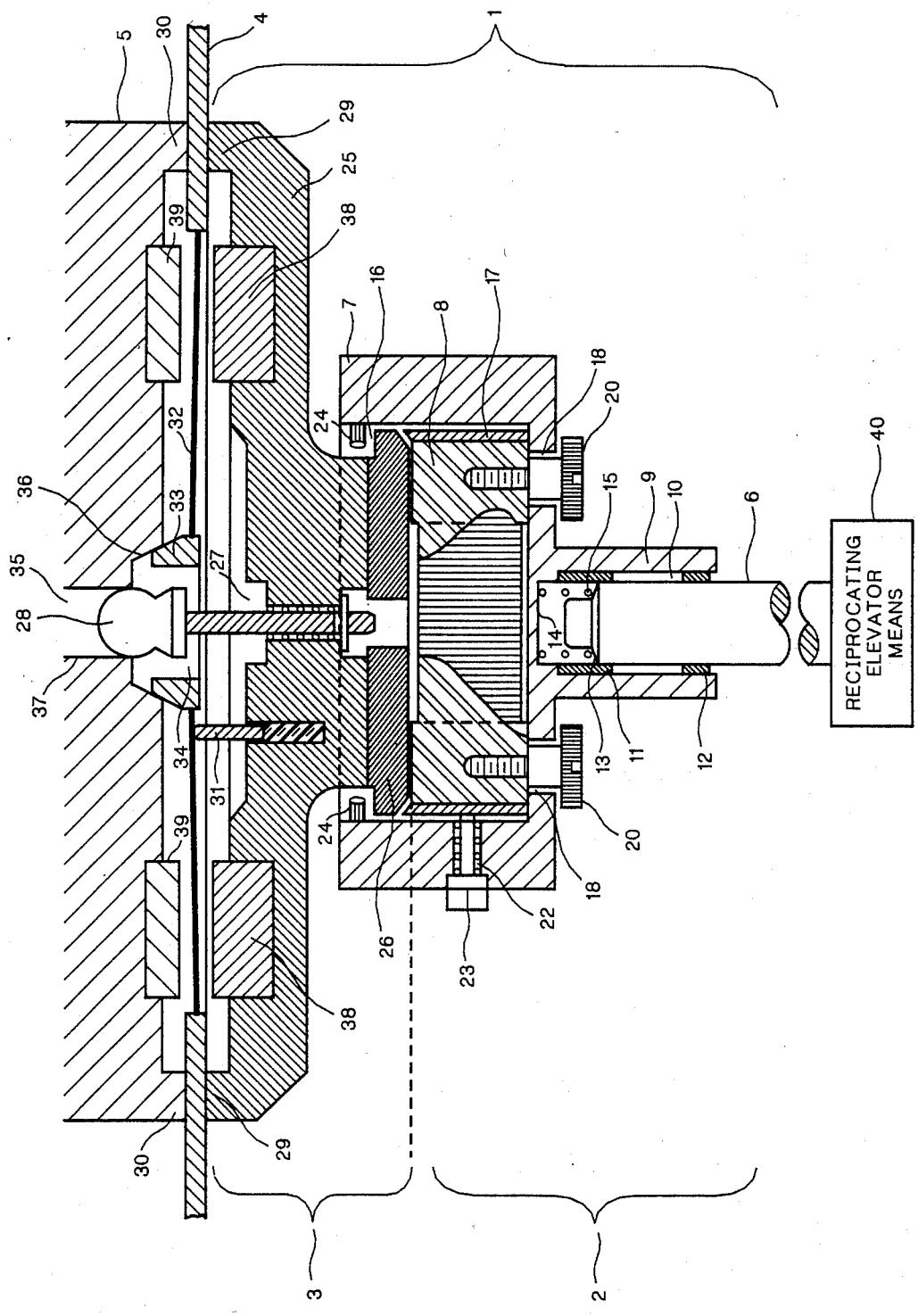
FIG. 2 is a sectional view of the disclosed invention particularly showing the disk support assembly being centered with respect to the device spindle.

In operation, as shown in FIG. 2, the electromagnet 8 located in the non-rotating assembly housing 7 is energized, clamping the rotating disk support assembly 3 to the non-rotating disk support assembly 2. A disk 4 is placed by known means on the disk support platter 25 with the lower surface of the disk 4 supported by the outer rim 29 of the disk support platter 25 and the centering stem 28 of the disk support platter 25 positioned to be able to pass through the center hole 34 of the disk centering hub 34. The reciprocating elevator means 40 is then activated, causing the entire apparatus 1 to raise toward the device spindle 5.

In the preferred embodiment, the reciprocating elevator means 40 raises the apparatus to a position to where the disk 4 firmly contacts the device spindle rim 30. However, the connecting rod 6 is slidably located in the shunt plate stem 9 so that any additional travel is absorbed by the compression spring 15 in order to prevent damage to the apparatus 1.

As shown in FIG. 2, when the disk 4 is firmly supported between the support platter rim 29 and the device spindle rim 30, the centering stem 28 engages the device spindle hole 35 in the device spindle 5, causing the non-rotating assembly 2 and the electromagnet 8 in the housing 7 to move laterally in order to center the disk support platter 25 relative to the device spindle 5. The centering stem 28 is only centering the rotating disk support assembly 3. The disk 4 itself is not centered by the cooperation between the hub centering stem 28 and the device spindle hole 35 in the device spindle 5. Because the center passage 34 of the disk 4 is larger than the centering stem 28, the centering stem 28 passes through the center passage without aligning the disk 4.

Figure 3:
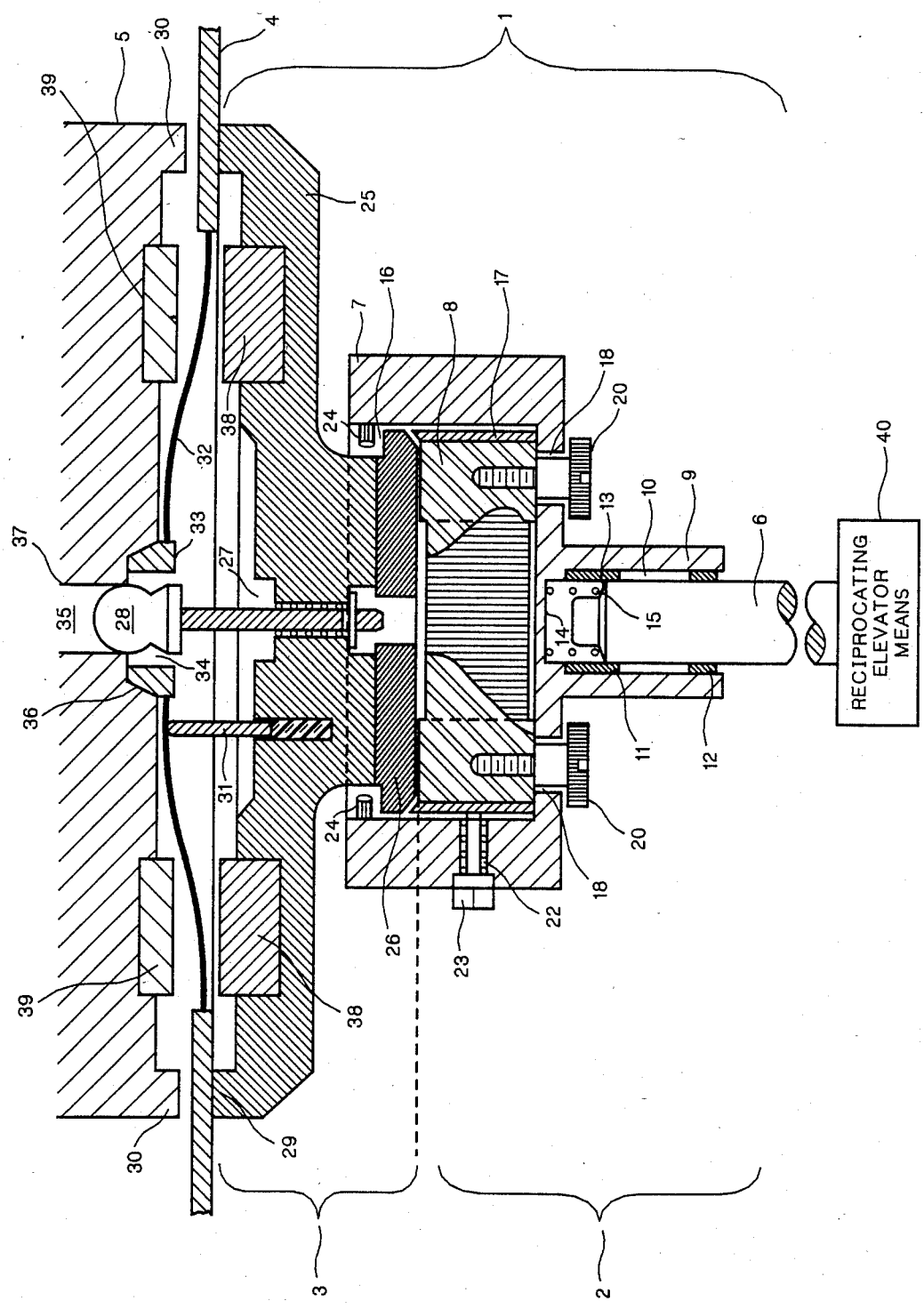
FIG. 3 is a sectional view particularly showing the disk being centered with respect to the device spindle.

As shown in FIG. 3, once the rotating disk support assembly 3 is centered, the plunger assemblies 31 are activated upward by any conventional means. In the preferred embodiment, the plunger assemblies are disposed in at least three holes in the disk support platter, the plunger assemblies having a reciprocating plunger for selectively deflecting the flexure 32 and disk centering hub 33 upward into the tapered lower portion 36 of the device spindle hole 35, so that the outer taper of the disk centering hub 33 fully seats in the interior taper of the spindle hole 35 and, completely centers the disk 4 relative to the device spindle 5. The outside taper of the disk centering hub 33 and the device spindle tapered portion of the hole 36 in the device spindle 5 cause the disk 4 to move laterally and become centered relative to the device spindle 5. Once the disk 4 is fully centered relative to the device spindle 5, and the disk 4 is sandwiched between the disk support assembly 3 and the spindle 5, the electromagnet 8 is deactivated allowing permanent magnets 38 in the disk support platter 25 to be pulled toward the device spindle 5 clamping the disk 4 between the device spindle 5 and the rotating disk support assembly 3.

Figure 4:
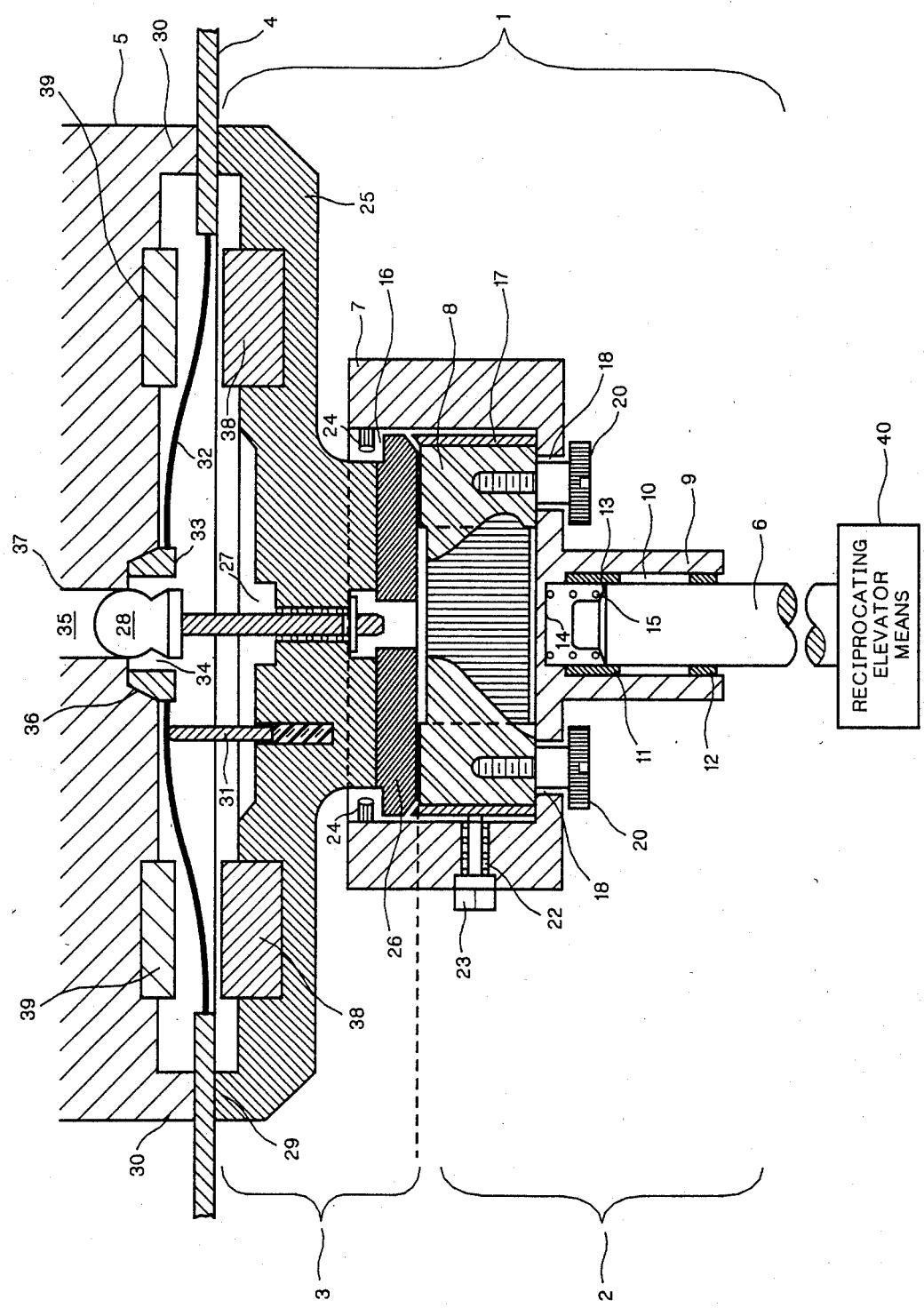
FIG. 4 is a sectional view particularly showing the disk being clamped between the device spindle and the disk support assembly.

As shown in FIG. 4, the electromagnet 8 in the housing 7 is deactivated, unclamping the shunt plate 26, and therefore the rotating disk support assembly 3, from the electromagnet 8 and the non-rotating disk support assembly 2. The reciprocating elevator means 40 is then activated to slightly lower the non-rotating disk support assembly 2 thereby removing the rotating disk support assembly 3 from contact with the non-rotating disk support assembly 2, so that the rotating disk support assembly 3 is now free to rotate with the device spindle 5, while the non-rotating disk support assembly 2 remains stationary.

For unload of the disk 4 from the device spindle 5 the above described sequence is reversed with the reciprocating elevator means 40 rising slightly so that the shunt plate 7 is centered relative to the electromagnet 8 by the tapered upper edge of the shunt plate centering ring 17. Once fully in contact with the shunt plate 26, the electromagnet 8 is energized, clamping the shunt plate 26 to the electromagnet 8. The holding force of the electromagnet 8 overpowers that of the permanent magnets 38, thereby unclamping the rotating disk support assembly 3 from the device spindle 5. Thereafter, as the elevator means is moved downward, the apparatus 1 is moved away from the device spindle 5. The disk 4, resting on the outer rim of the disk support platter 25 is moved downward along with the apparatus 1. At the lower position, the disk 4 can be removed from the disk support platter 25 by any well known means.

We claim:

1. An apparatus for selectively clamping an optical information recording disk to a spindle in an optical information recording device, said apparatus comprised of:
    a reciprocating elevator means;
    a non-rotating disk support assembly, said non-rotating disk support assembly being attached to the reciprocating elevator means;
    a rotating disk support assembly, said rotating disk support assembly supporting the disk to be clamped to the device spindle;
    magnetic clamping means for selectively clamping support assembly to the non-rotating disk support assembly comprising:
        an electromagnet, said electromagnet being disposed in the non-rotating disk support assembly,
        a magnetically permeable shunt plate, said shunt plate being attached to a bottom surface of the rotating disk support assembly and having a taper around a lower rim thereof,
        means for selectively energizing the electromagnet during disk load and unload operations, but de-energizing the electromagnet when the disk is clamped to the device spindle for device rotation, and a shunt plate centering ring, said ring being attached around the electromagnet and having a tapered upper end which cooperates with the lower taper around the magnetic shunt plate to cause the magnetic shunt plate, and thereby the rotating disk support assembly, to be properly positioned and centered over the electromagnet;

means for centering the rotating disk support assembly on the device spindle;

means for centering the disk on the device spindle; and means for selectively clamping the rotating disk support assembly, and in turn the disk, to the device spindle for spindle rotation.

2. An optical disk clamping apparatus as recited in claim 1, wherein the non-rotating disk support housing is comprised of:

a non-magnetic housing, said housing having an upward facing cavity, said cavity having a first plurality of holes in the bottom of the housing for passage of a first plurality of electromagnet mounting screws;

means for attaching the housing to the reciprocating elevator means; and a plurality of electromagnet mounting screws, each of said screws passing through a respective hole in the bottom of the housing, said screws thereafter being threadably attached to the electromagnet.

3. An optical disk clamping apparatus as recited in claim 2, wherein the means for centering the rotating disk support assembly relative to the device spindle is comprised of:

a centering stem;

the rotating disk support assembly further having a passage in the center of the upper surface for the fixed mounting of the centering stem; and the device spindle further having a center hole for receiving the centering stem, said spindle hole having a lower tapered portion which has a diameter that is larger than the diameter of the upper end of the centering stem and tapering to an upper tapered portion having a diameter just slightly larger than the diameter of the upper end of the centering stem, whereby inserting the center stem into the spindle hole causes the center stem to be centered therewithin;

whereby the means for slidably attaching the electromagnet to the inside of the cavity allowing the electromagnet to laterally move with the rotating disk support assembly when the electromagnet is clamped to the shunt plate as the centering stem engages and slides into the tapered spindle hole, causing the rotating disk support assembly to move to a centered position relative to the device spindle.

4. An optical disk clamping apparatus as recited in claim 3, wherein the means for centering the disk relative to the device spindle is comprised of:

the disk further having a center hole into which is attached a thin, deflectable flexure, said flexure in turn having a center hole into which is attached a disk centering hub, said disk centering hub also in turn having a center passage of a diameter larger than the diameter of the upper end of the centering stem, the centering stem passing through the center passage of the disk centering hub, said disk centering hub further having an outside upper taper to engage the tapered lower portion of the spindle hole;

the interior tapered lower portion of the spindle hole further having a taper substantially the same as the exterior taper on the disk centering hub; and at least three plunger assemblies, said plunger assemblies disposed in at least three holes in the disk support platter, said plunger assemblies having a reciprocating plunger for selectively deflecting the flexure and disk centering hub upward, so that the outer taper of the disk centering hub fully seats in the interior taper of the spindle hole, completely centering the disk relative to the device spindle.

5. An optical disk clamping apparatus as recited in claim 4, wherein the means for selectively clamping the rotating disk support assembly to the device spindle is comprised of:

the device spindle further having a rim on its lower mating surface, said rim having a diameter substantially the same as that of the rim on the disk support platter and said device spindle further having a shunt plate ring located on its mating surface, said ring having a diameter such that the ring is positioned fully over the disk flexure;

the disk support platter further having a plurality of permanent magnets located on the upper surface of the support platter such that the permanent magnets can magnetically clamp the rotating disk support assembly to the device spindle, clamping the disk between the device spindle and the support platter when the elevating means presents the rotating disk support assembly to the disk spindle, thereafter the electromagnet being de-energized and the non-rotating disk support assembly being lowered slightly by the elevator means, allowing the disk and rotating disk support means to freely rotate with the device spindle.

6. An apparatus for selectively clamping an optical information recording disk to a spindle in an optical information recording device, said apparatus comprising:

reciprocating elevator means;

non-rotating disk support assembly, said non-rotating disk support assembly being attached to the reciprocating elevator means;

a rotating disk support assembly, said rotating disk support assembly supporting the disk to be clamped to the device spindle;

means for selectively clamping the rotating disk support assembly to the non-rotating disk support assembly;

means for centering the rotating disk support assembly on the device spindle;

means for centering the disk on the device spindle;

means for selectively clamping the rotating disk support assembly, and in turn the disk, to the device spindle for spindle rotation; and means for manually unclamping the rotating disk support assembly from the non-rotating disk support assembly, said means comprising:

a plurality of retractable retaining pins, said pins disposed in the non-rotating disk support assembly, the rotating disk support assembly further having a lower lip which cooperates with the fully inserted retaining pins to pull the rotating disk support means downward when the non-rotating disk support means is manually moved downward, means for manually inserting the retaining pins, and means for manually lowering the elevator.

* * * * *